US008413210B2

(12) United States Patent
Kuzin et al.

(10) Patent No.: US 8,413,210 B2
(45) Date of Patent: Apr. 2, 2013

(54) CREDENTIAL SHARING BETWEEN MULTIPLE CLIENT APPLICATIONS

(75) Inventors: Sergey Kuzin, Redmond, WA (US); Olga Ivanova, Redmond, WA (US); Ashwin Palekar, Sammamish, WA (US); Kashif Mehmood, Bellevue, WA (US); Sriram Sampath, Redmond, WA (US); Ersev Samim Erdogan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 984 days.

(21) Appl. No.: 12/331,293

(22) Filed: Dec. 9, 2008

(65) Prior Publication Data
US 2010/0146611 A1 Jun. 10, 2010

(51) Int. Cl.
*G06F 7/04* (2006.01)
*G06F 17/30* (2006.01)
(52) U.S. Cl. ............................... 726/2; 726/26; 726/28
(58) Field of Classification Search .................. None
See application file for complete search history.

(56) References Cited

U.S. PATENT DOCUMENTS

| | | | |
|---|---|---|---|
| 6,055,637 A * | 4/2000 | Hudson et al. | 726/20 |
| 7,139,758 B1 * | 11/2006 | Laws et al. | 1/1 |
| 7,296,290 B2 * | 11/2007 | Barriga et al. | 726/8 |
| 7,536,722 B1 * | 5/2009 | Saltz et al. | 726/20 |
| 7,788,709 B1 * | 8/2010 | Henry et al. | 726/6 |
| 2005/0154887 A1 * | 7/2005 | Birk et al. | 713/168 |
| 2005/0257196 A1 | 11/2005 | Hollander et al. | |
| 2006/0230438 A1 | 10/2006 | Shappir et al. | |
| 2007/0006291 A1 | 1/2007 | Barari et al. | |
| 2007/0143430 A1 * | 6/2007 | Johnson et al. | 709/206 |
| 2007/0157298 A1 | 7/2007 | Dingwall et al. | |
| 2007/0180448 A1 | 8/2007 | Low et al. | |
| 2007/0277231 A1 | 11/2007 | Medvinsky et al. | |

OTHER PUBLICATIONS

Pearlman et al., "A Community Authorization Service for Group Collaboration", POLICY '02, IEEE, 2002, pp. 1-10.*
Shimonski, R.J., "Enable Single Sign-On (SSO) for Windows Server 2008 Terminal Services," http://www.msterminalservices.org/articles/Enable-Single-Sign-On-SSO-Windows-Server-2008-Terminal-Services.html, Feb. 13, 2008, 1-9.
"Windows Server 2008: Frontside Authentication and SSO," http://www.ditii.com/2008/02/21/windows-server-2008-frontside-authentication-and-sso/, Feb. 21, 2008, 1-6.
"v-GO Single Sign-On (SSO)," http://www.entrust.com/partners/solutions/107.htm, 2008, 1-3.
"OneSign® Single Sign-On (SSO)," http://www.imprivata.com/onesign_sso, 2008, 1-3.

* cited by examiner

Primary Examiner — William Powers
(74) Attorney, Agent, or Firm — Woodcock Washburn LLP (57) ABSTRACT

Disclosed are techniques for sharing user credentials between multiple client applications when connecting to a set of remote resources. The mechanism enables a single sign-on between a terminal server web access service and the remote applications, remote desktops and corresponding terminal servers accessible through the service. User credentials may be received by one of the client applications and passed to a credential store running as a local software object in association with the user's logon session. Further requests to launch a new remote connection may then pass through the credential store. Upon successful validation of the request, the credential store may attach user credential information to the request and pass the request to the requested client. The requested client may also execute as a software object associated with the current logon session. The client may then use the supplied credential for authentication to the requested resource or application.

19 Claims, 11 Drawing Sheets

CREDENTIAL SHARING BETWEEN MULTIPLE CLIENT APPLICATIONS

BACKGROUND

Remote access systems enable users to remotely access resources hosted on remote systems. Servers on the remote computing systems can execute programs and transmit signals indicative of a user interface to clients that can connect by sending signals over a network conforming to a communication protocol such as the TCP/IP protocol. Each connecting client may be provided a session, i.e., an execution environment that includes a set of resources. Each client can transmit signals indicative of user input to the server and the server can apply the user input to the appropriate session. The clients may use protocols such as the Remote Desktop Protocol (RDP) to connect to one or more server resources. Protocols such as RDP typically handle graphics, device traffic such as USB, printer keyboard and mouse and in addition, virtual channels for application between server and a client. The terminal server hosts client sessions which can be in hundreds in a typical server configuration.

When a client makes a remote access connection to a terminal server, the authentication credentials used to authenticate the user may not be shared between the web access server and additional terminal server connections. Thus a user may need to repeatedly enter authorization information in order to access additional resources. Thus it would be advantageous if remote access users can be provided a single authentication sign-on procedure that authenticates the user to access further downstream resources and applications without the need to re-authenticate.

SUMMARY

Methods and systems are disclosed for providing a mechanism for sharing user credentials between multiple client applications when connecting to a predefined set of remote resources. In various embodiments, the mechanism enables a single sign-on between a terminal server web access service and the remote applications, remote desktops and corresponding terminal servers accessible through the service.

In one embodiment, user credentials may be received by one of the client applications and passed to a credential store running as a local software object in association with the user's logon session. Further requests to launch a new remote connection may then pass through the credential store. Upon successful validation of the request, the credential store may attach user credential information to the request and pass the request to the requested client application. The requested client application may also execute as a software object associated with the current logon session. The client application may then use the supplied credential for authentication to the requested resource or application.

In various embodiments the user credentials may be stored in memory in encrypted format for the duration of the local interactive logon session. The credentials may be used for a specified set of remote resources and deleted when the credentials are no longer needed.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Computing Environments in General Terms

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 2:
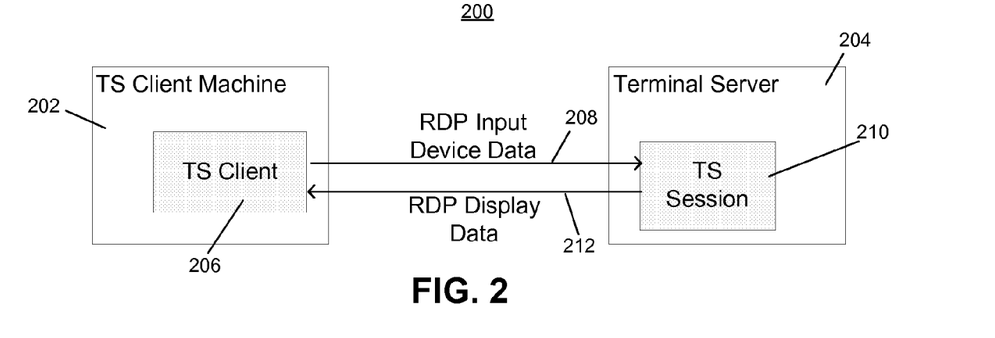
FIGS. 2-4 depict an operational environment for practicing aspects of the present disclosure.

FIG. 2 shows an implementation 200 enabling terminal services. A TS client machine 202 and a TS 204 communicate using RDP. The TS client machine 202 runs a TS client process 206 that sends RDP input device data 208, such as for example keyboard data and mouse click data, to a TS session 210 that has been spawned on the TS and receives RDP display data 212, such as user interface graphics data. Generally, the TS client process 206 is a thin client process and most processing is provided on the TS 204.

Figure 3:
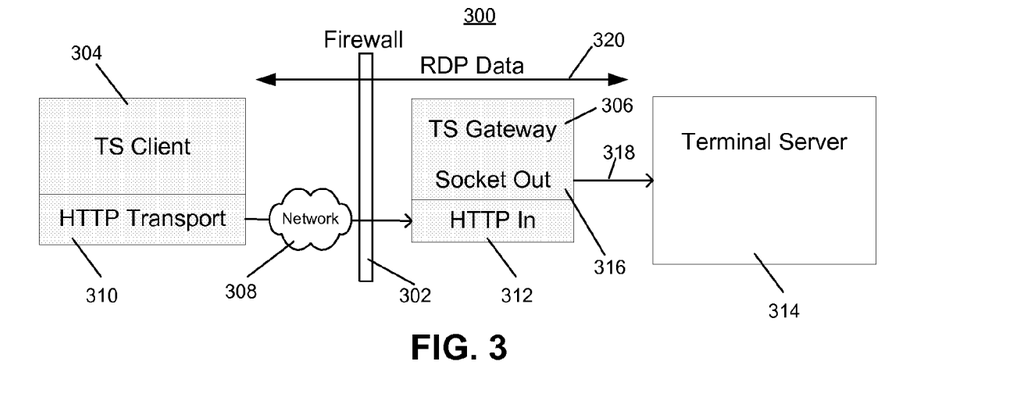

FIG. 3 shows an implementation 300 enabling terminal services through a firewall 302. A remote TS client 304 connects to a terminal services gateway (TSG) 306 over a network 308. A Hypertext Transfer Protocol (HTTP) transport process 310 on the TS client and an HTTP process 312 on the TSG 306 facilitate communication through the firewall 302. The HTTP transport process 310 wraps data, such as Remote Procedure Call (RPC) data or RDP data, in HTTPS headers for the TSG 306. The TSG 306 may connect to the TS 314 over a socket connection 318 via a socket out process 316. Once the TS client 304 is authenticated and a connection is established, RDP data 320 may be passed back and forth between the TS client 304 and the TS 314.

Figure 4:
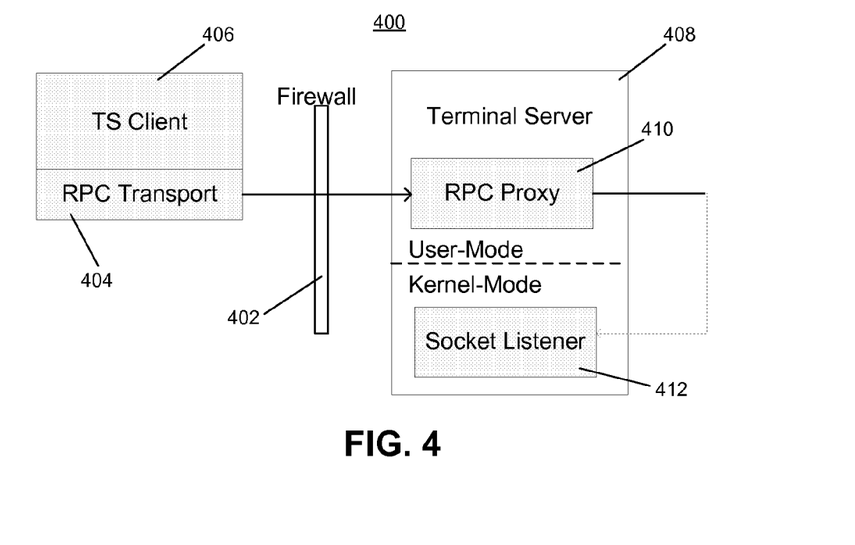

FIG. 4 shows a generalized example of an implementation 400, wherein an existing remote procedure call/hypertext transport protocol (RPC/HTTP) proxy is leveraged, thereby providing a terminal services protocol, such as RDP, over an RPC/HTTP connection through a firewall 402. The architecture of the implementation illustrates that by wrapping the RDP protocol within RPC calls, an existing RPC-based proxy can be advantageously utilized. In particular, an RPC Transport Plug-In 404 on the TS client 406 wraps an RDP stream providing communication between the TS client 406 and the terminal server 408 within an RPC protocol. This facilitates utilization of an RPC-based proxy, thereby enabling firewall navigation. The RPC-based proxy 410, which may run in a user-mode on the TS, can forward received data to a socket listener 412, which may run in kernel-mode on the TS.

As discussed above, clients may use a remote protocol such as Remote Desktop Protocol (RDP) to connect to a resource using terminal services. When a remote desktop client connects to a terminal server via a terminal server gateway, the gateway may open a socket connection with the terminal server and redirect client traffic on the RDP port or a port dedicated to remote access services. The gateway may also perform certain gateway specific exchanges with the client using a terminal server gateway protocol transmitted over HTTPS.

Figure 1:
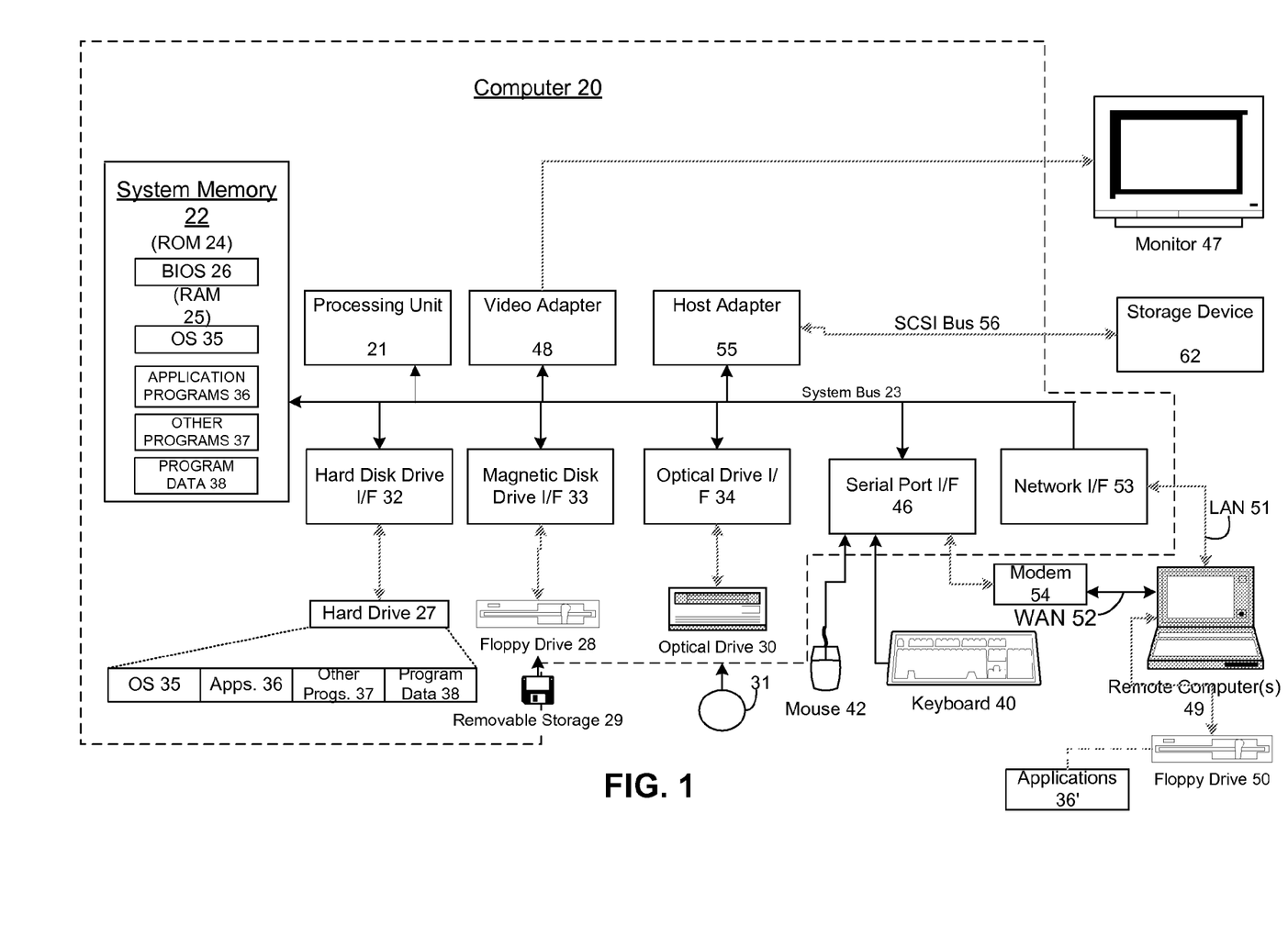
FIG. 1 depicts an example computer system wherein aspects of the present disclosure can be implemented.
Figure 1A:
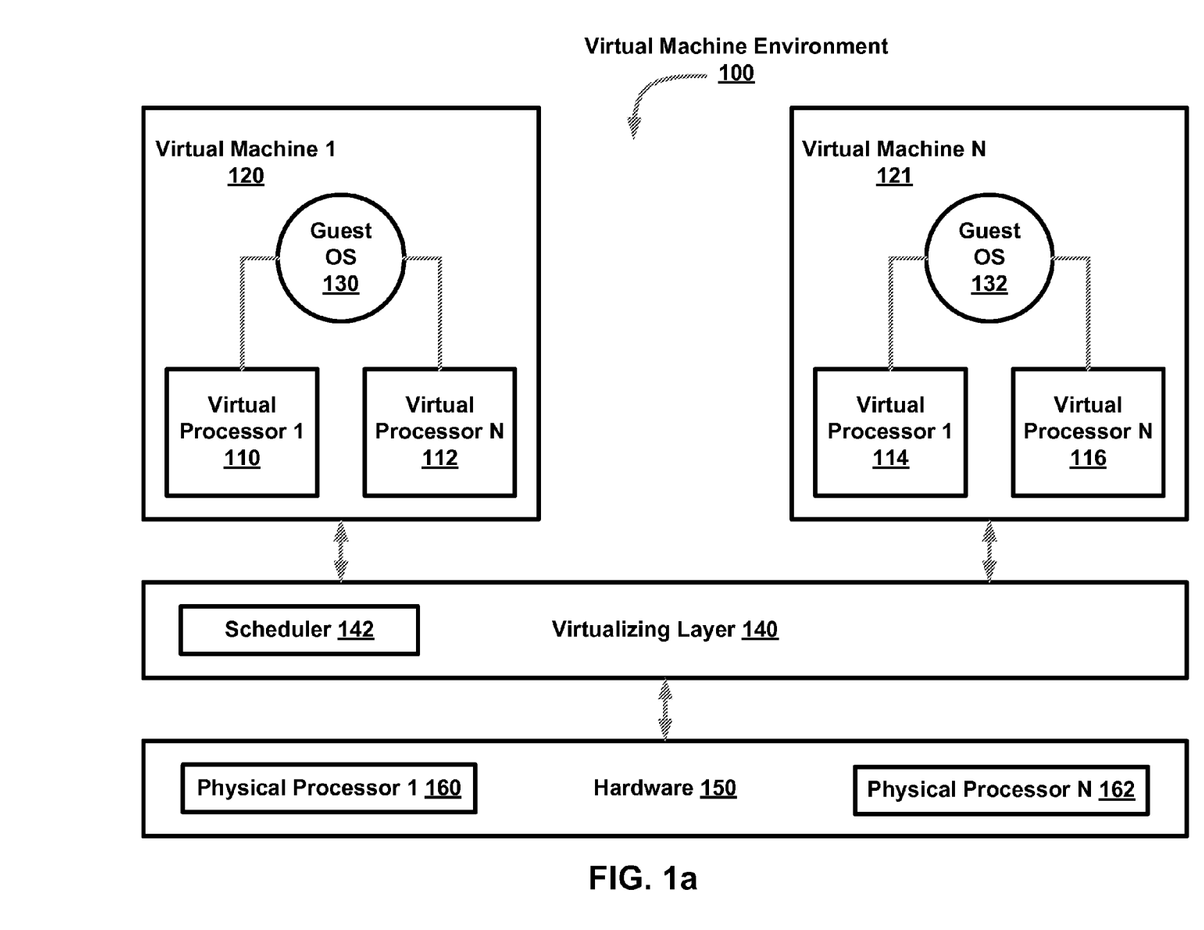
FIG. 1a illustrates a virtual machine environment, with a plurality of virtual machines, comprising a plurality of virtual processors and corresponding guest operating systems; the virtual machines are maintained by a virtualizing layer which may comprise a scheduler and other components, where the virtualizing layer virtualizes hardware for the plurality of virtual machines.

A virtual machine monitor, such as a hypervisor, is a program that creates virtual machines, each with virtualized hardware resources which may be backed by underlying physical hardware resources. FIG. 1a illustrates a virtual machine environment 100, with a plurality of virtual machines 120, 121, comprising a plurality of virtual processors 110, 112, 114, 116, and corresponding guest operating systems 130, 132. The virtual machines 120, 121 are maintained by a virtualizing layer 140 which may comprise of a scheduler 142 and other components (not shown), where the virtualizing layer 140 virtualizes hardware 150 for the plurality of virtual machines 120, 121. The plurality of virtual processors 110, 112, 114, 116 can be the virtual counterparts of underlying hardware physical processors 160, 162.

All of these variations for implementing the above mentioned partitions are just exemplary implementations, and nothing herein should be interpreted as limiting the disclosure to any particular virtualization aspect.

Credential Sharing

Figure 5:
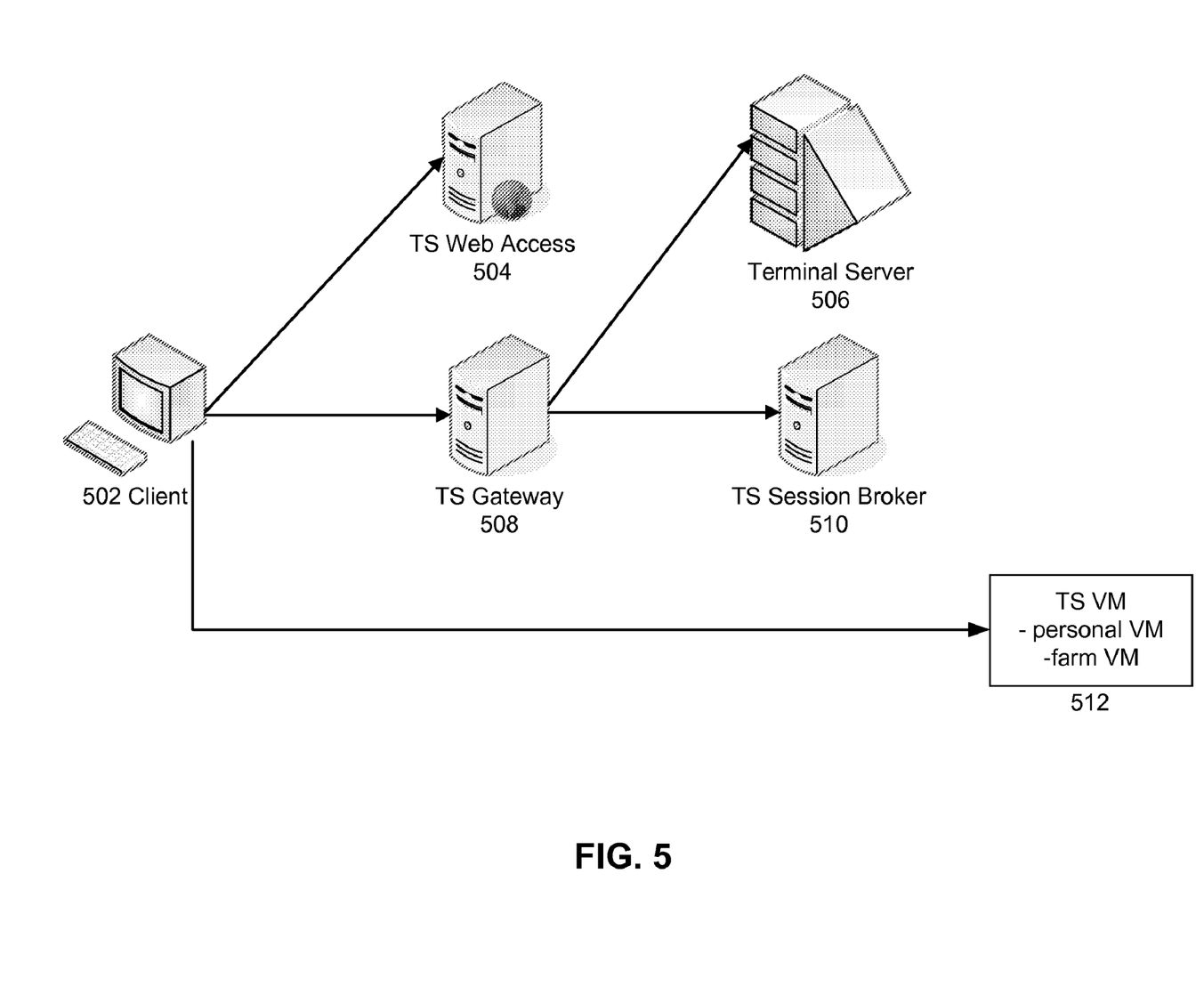
FIG. 5 illustrates an example system in which user credentials may be shared between multiple client applications.

Remote and virtual computing environments are becoming more prevalent. In such environments users such as corporate employees may work outside of the office and the corporate domain and work at home or on kiosk machines that are not directly connected to the corporate network. Such remote users require a remote access infrastructure and a seamless end user experience to securely access their remote workspaces across any Internet connection. FIG. 5 illustrates an overview of various servers in the connection sequence for using remote applications via the Internet. A terminal services gateway (TSG) 508 is a server that may allow authenticated and authorized remote desktop clients to connect to terminal services resources inside a network, such as a corporate network. The clients may use protocols such as the Remote Desktop Protocol (RDP) to connect to a resource within the corporate network through the gateway. When a remote desktop client 502 connects to a terminal server 506 via a terminal services gateway 508, the gateway typically opens a socket connection with the terminal server and redirects all client traffic to a port normally reserved for such purposes. TS Web Access 504 allows administrators to publish remote access files for remote applications so that the client 502 may navigate to a website hosted by a TS Web Access server 504 and launch remote applications. These remote applications may run alongside local applications on the client machines.

A drawback of such remote access systems is that when there are multiple servers in the connection sequence, such as a terminal services web access server, terminal gateway server, and terminal server environment, users typically need to authenticate to each of these servers and may thus be prompted for the same credentials twice—first at terminal services web access server and then again at the terminal gateway server, and terminal server environment. Such a situation is illustrated in FIG. 5. It would be advantageous to avoid such multiple log-on sequences and provide the ability to enter credentials only once to authenticate to all the servers in the connection sequence and thus improving the user experience.

Disclosed herein are mechanisms for sharing user credentials between multiple client applications when connecting to a predefined set of remote resources. In an embodiment, a single sign-on mechanism between a terminal services web access service and one or more remote applications, remote desktops and corresponding terminal servers may be provided.

In an embodiment, user credentials may be collected by one of the client applications and then passed to a credential store running as a local component object model (COM) server within the user's logon session. COM is a platform-independent, distributed, object-oriented system for creating binary software components that can interact and enables developers to create re-usable software components. A COM server is an object that provides services to clients. Such services may be in the form of COM interface implementations that can be called by any client that is able to access a pointer to one of the interfaces on the server object.

Further requests to launch a new remote connection may pass through the credential store, which, upon successful validation of the request, may attach a saved user credential to the request and pass the request to the appropriate client. The client may also be running as a COM server in the same logon session. The client may then use the provided credential for authentication to the associated remote resource.

The credential store may be a dynamic object that stores a user's credentials in memory in encrypted format for the duration of the local interactive logon session. The credentials may be used to access a specified set of remote resources and later deleted when they are no longer needed.

In some embodiments of the single sign-on process, a user may first log on to a logon server and his static logon credential may exchanged for a temporary credential returned to the client in the form of a one time password, cookie, token, ticket, and the like. The client application may then present this temporary credential to the desired service or application, which translates the temporary credential into the real user identity.

The above embodiment may further be modified to provide additional features such as (1) do not require special credential management on the server side, (2) only require the server side applications to understand real user credentials, (3) enable delegation of user credentials to the server, and (4) once server side changes are no longer required, the single sign-on may be extended to include new types of services/applications by changing only the client applications.

In various embodiments, a single sign on process may associate user credentials with specific services based on criteria other than the server name associated with the requested service. For example, a user's workspace identifier and a list of trusted certificates may be used. Other criteria may be used depending on the particular scenario. In other embodiments, the single sign on process may delete the user's credentials in the credential store when the credentials are no longer needed.

In one embodiment, when a user has requested a remote access application, a new COM server may created to act as a credential store. The credential store may run inside the user logon session. The credential store may further expose interfaces for storing and deleting credentials, associating the credentials with a predetermined set of remote resources, and for launching remote connections. A set of resources for which the saved credentials are intended may be defined by a combination of a unique identifier and information required for verifying the authenticity of connection requests. In one embodiment this information may be provided by a list of trusted certificates.

In various embodiments, different user credentials may be stored independently for different sets of resources. In one embodiment, the credentials may be stored in memory and encrypted so that only applications running as the same logged on user can decrypt the credentials. Client applications may also be converted into COM objects that run inside the user logon session. The client applications and credential store may communicate with each other using predefined COM interfaces.

In one embodiment, a request for a new connection may be directed to the credential store and the request may further contain a configuration file. The configuration file may comprise a unique ID and the connection properties may be signed with a certificate. When handling a request for a new connection, the credential store may verify the configuration file signature and determine the appropriate user credential. If the credential is found, the credential store may attach the credential to the request and then forward the request to the appropriate client application.

When a user's credentials are no longer in use, the user may delete the credentials from the credential store manually, or they may be deleted after a predefined timeout period.

In some embodiments, the credential store may be configured to interact with more than one type of client application. When interacting with multiple applications, the determination as to which client application to use may be based on information provided in the connection request.

Figure 6:
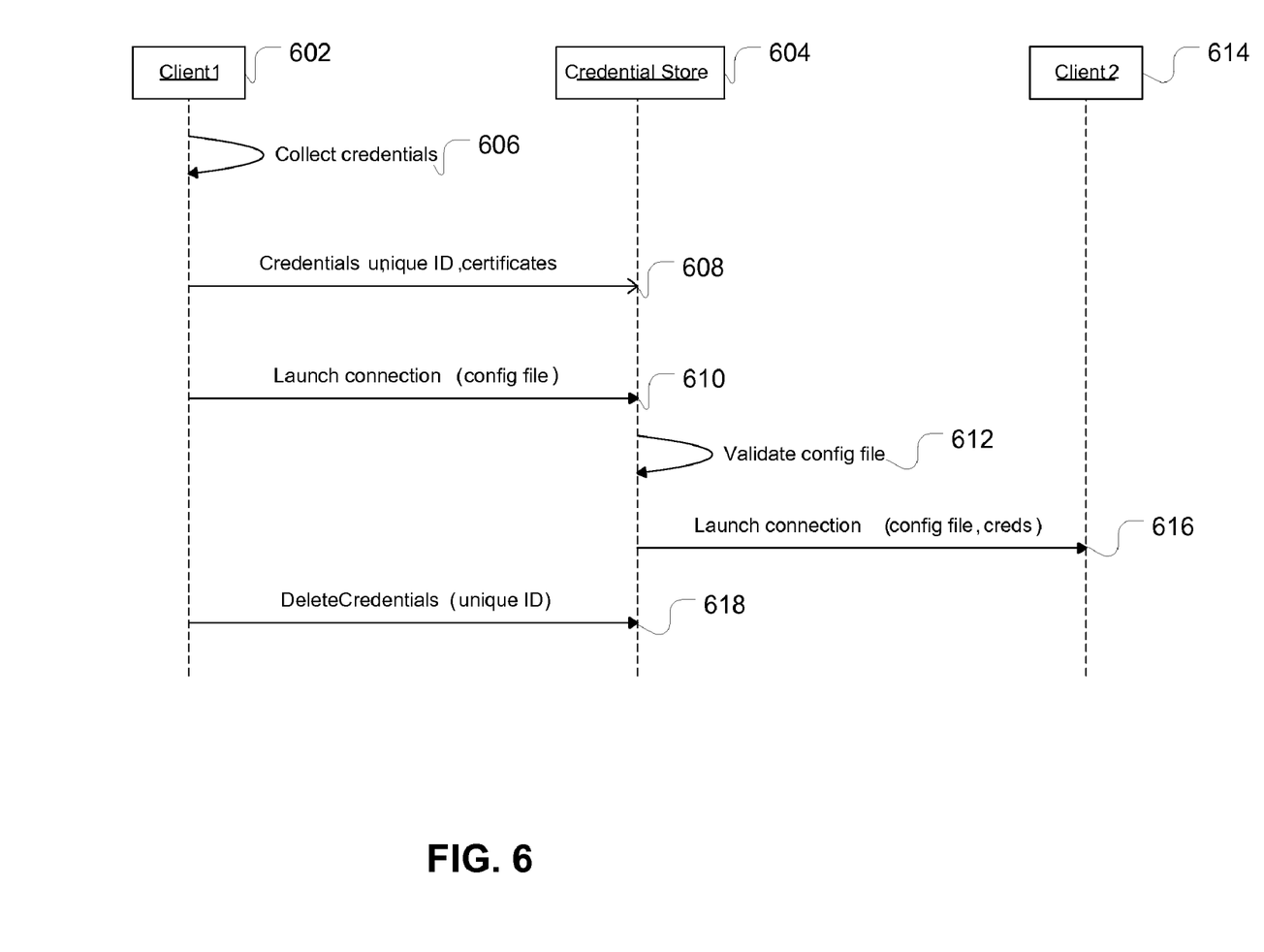
FIG. 6 illustrates an illustrative embodiment of sharing user credentials between multiple client applications.

Referring to FIG. 6, client 1 (602) may collect user credentials 606 via a web form and then pass 608 the credentials to the credential store 604. In an embodiment, a script on a terminal services web page may perform the role of client 1 (602), and a workspace runtime COM object may perform the role of the credential store 604.

Along with the credentials, client 1 602 may pass 608 a unique ID and a list of trusted certificates. The unique ID may, for example, be a workspace ID which is a string that identifies a set of remote applications that the credentials are intended for. The credential store may then save the credentials in its database using the unique ID as a key.

Client 1 602 may then perform a user login to the web terminal service and retrieve a list of remote applications assigned to the user. When a user attempts to launch a remote application from the web page, the client 1 602 may send the request 610 to the credential store 602. The request may contain the unique ID and a signed remote access file. In one embodiment, the signed remote access file may be an RDP file. The entries in the remote access file related to the target server identity and security options may be part of the signature and typically are not changed.

The credential store may 612 validate the request by finding the corresponding entry in its database, verifying the signature of the remote access file, and comparing the signing certificate with the list of certificates associated with the saved credential. If validation 612 succeeds, the user credential may then be attached to the request and the request may be sent 616 to client 2 614.

When the user logs off from the terminal services web site, Client 1 602 may call into the credential store 604 and delete 618 the saved credential.

In various embodiments disclosed herein, a logon session may describe the environment in which all of the user's client applications and associated credential repository executes. A logon session may commence after logging into a computing terminal, such as a Windows machine, and may terminate after logging off the terminal. In this context, authentication credentials are used to initiate a logon session, and authentication credentials may be used to access remote resources. The credentials used to access remote resources may be saved in the credential repository and thus may be different from the logon credentials. In one embodiment of the present disclosure, all applications, including the credential repository running in the same logon session, may be isolated from applications running in other logon sessions on the same machine, and the applications may be terminated when the user logs off. Thus saved credentials will only exist for the duration of the logon session and cannot be accessed by other users.

The credential repository validates access requests and determines if saved credentials are to be used in conjunction with the request. Different criteria may be used for determining this validation. In one embodiment the target resource name can be compared with the name saved with a credential associated with the user. In another embodiment, the repository may compare a certificate signing the request with a certificate saved along with the credential.

In addition to "logon session," a "remote access session" may be defined as the period between when a user connects to a first remote resource and disconnects from the last resource. In some embodiments, the credentials may be deleted from the repository when the remote access session ends, but under certain circumstances (for example, if a client application has terminated unexpectedly due to an error in the code or in the hardware) the credentials may be maintained until the end of the "logon session."

A web service that provides remote access to terminal services may allow system administrators to publish remote access files for remote applications so that end-users can navigate to a website and launch remote applications. Such remote applications may run alongside local applications on client machines.

The web logon procedure may be designed to be similar in look and feel to other familiar logon processes (for example, users may be prompted to enter credentials similar to Outlook Web Access (OWA) and many other form-based authentication mechanisms).

Figure 7:
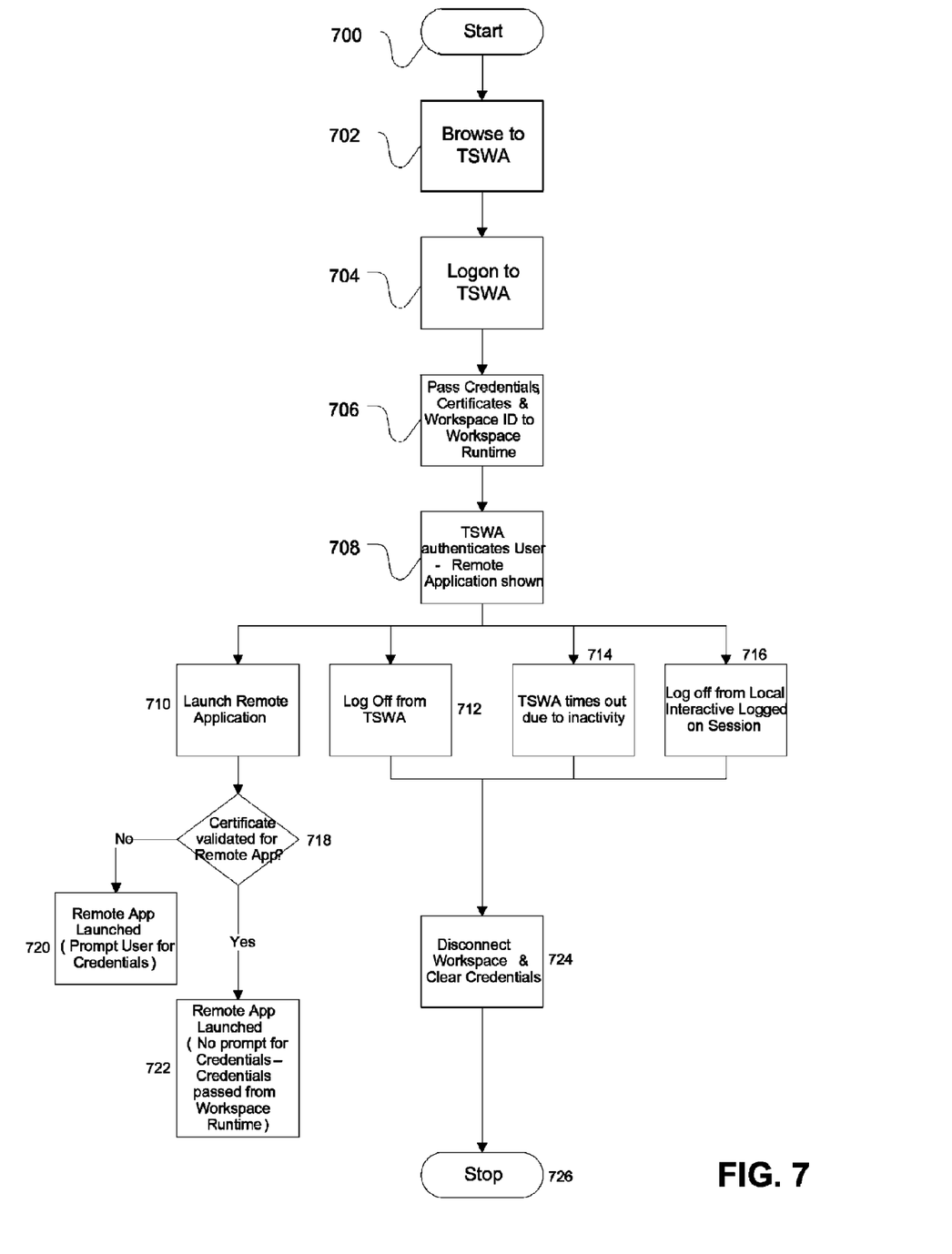
FIG. 7 illustrates a flow diagram depicting an illustrative embodiment of sharing user credentials between multiple client applications.

The illustrative examples provided below may be better understood in conjunction with FIG. 7. The following provides an illustrative example of a single sign on embodiment in which same-domain clients on the internet may launch remote applications on a single terminal server or farm. Administrator A may publish a set of remote applications, hosted on the same terminal server farm, using terminal server web access services. Administrator A may also ensure that each remote access file is signed with a trusted certificate. User A may be a terminal services end-user at Administrator A's company and often work from home in the evening. User A may use a work laptop to connect to a terminal services portal in order to remotely access applications. User A only has to enter her domain user name and password once on the terminal services web logon page, after which terminal services can access different pages of the web portal and the remote applications published on the portal without any further credential prompts.

The following is an exemplary logoff scenario in accordance with various aspects of the present disclosure. Once User A is finished working from home, User A can click the logoff button on the web portal, which makes it clear to User A that the action will disconnect her from the workspace. The next time User A needs to use the workspace, User A will need to re-enter her credentials since her session has been disconnected from both the web and remote applications.

In another embodiment, User A may forget to close opened remote applications and also forget to click the logoff button. User A may then leave her work laptop running and tend to other activities. When User A returns twenty minutes later, User A may find that the system logged her off so to get back in she will need to re-enter her credentials.

Furthermore, User A may be working in remote applications but her browser closes (either she closes the browser or something unexpected occurs). She will still be able to keep working on her open remote applications. However, when user A leaves her laptop, the stored credentials may be deleted after a predetermined timeout (20 minutes or other time period as defined by the system administrator). When the browser is closed, her credentials may be deleted after the timeout. In either case User A can continue using her open remote applications.

Users may be provided a similar experience when connecting to the web services while in the office and on a corporate intranet.

The following is an exemplary logon scenario in accordance with various aspects of the present disclosure in which single sign on services are provided to non-domain clients on the internet and remote applications are accessed on a single terminal server or farm. In this embodiment, User A may use a home PC to access the remote access web and to launch remote applications. User A may be provided the same logon experience using a home PC as when using a work laptop. The only difference may be that a domain client may have general policies set for a list of trusted certificates. The home PC will not have the trusted certificates so User A will be given remote access trust prompts on the home PC but not on the domain machine.

The following is an exemplary logon scenario in accordance with various aspects of the present disclosure in which clients on the internet may launch remote applications on multiple terminal servers or farms. Administrator A may publish a set of remote applications hosted on the multiple terminal server farms using terminal server web access services.

Administrator A may also ensure that each remote access file is signed with a trusted certificate. User A may be provided the same single sign on user experience as in the above scenarios.

The following is an exemplary logoff scenario in accordance with various aspects of the present disclosure in which multiple terminal server workspaces or multiple browser windows are connected to the same workspaces. User A may start a first terminal services web session in one browser window and launch one or more remote applications. User A may then forget that the first browser window is open and launch a new browser window and log on again to the same workspace. User A may navigate between both open browser windows and access remote applications without the need to be prompted for authorization.

In an embodiment, if a user navigates to multiple terminal service web workspaces, the credential repository should contain credentials to all the workspaces that the user is logged into.

The following are exemplary logoff scenarios in accordance with various aspects of the present disclosure:

Logoff: User A is finished working from home and closes all her remote applications and clicks logoff on a workspace icon. The next time the user needs to visit the workspace, she will need to re-enter her credentials.

Closing Remote Applications: Similar to the example above, User B is finished working so he closes all of his remote applications. After a timeout period, the taskbar icon may indicate that the user is logged off. The next time User B wants to access the remote applications, he will need to re-enter his credentials.

Time Out: Alternatively, User B may forget to close the remote applications and to click logoff. He leaves his work laptop running and leaves the laptop. User B will be disconnected from the terminal servers after a timeout period (e.g., twenty minutes). In order to access the remote applications again, he will need to re-enter his credentials.

The following is an exemplary logon scenario in accordance with various aspects of the present disclosure in providing a single sign on for same-domain clients when launching remote applications hosted on multiple terminal servers or farms. Administrator A may publish a set of remote applications hosted on the multiple terminal server farms. Administrator A may also ensure that each remote access file is signed with a trusted certificate. User A should have the same single sign on user experience as in the examples above.

Figure 8:
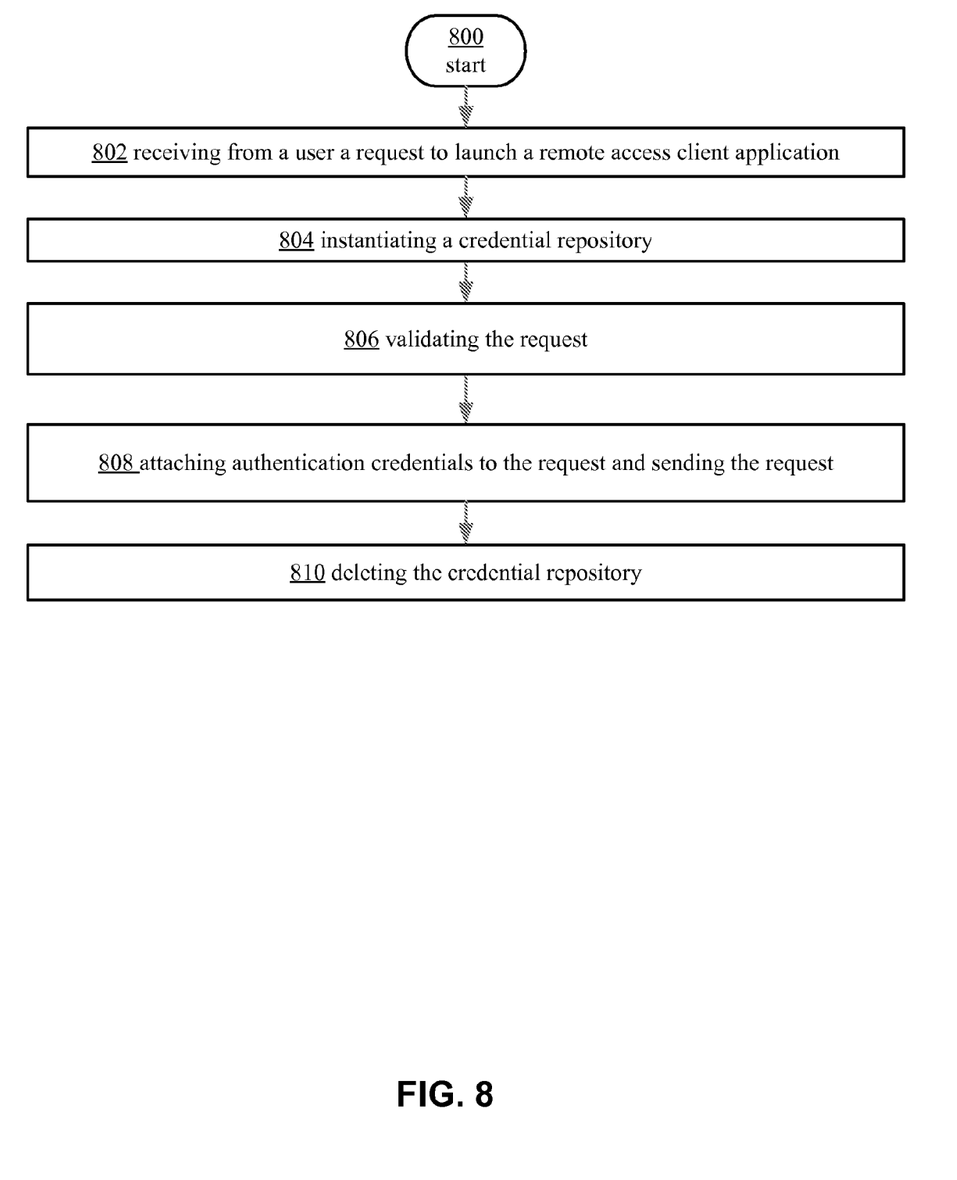
FIG. 8 illustrates an example operational procedure for practicing aspects of the present disclosure.

FIG. 8 depicts an exemplary operational procedure for sharing user credentials between remote access client applications including operations 800, 802, 804, 806, 808, and 810. Referring to FIG. 8, operation 800 begins the operational procedure and operation 802 illustrates receiving from a user a request to launch a remote access client application. Operation 804 illustrates receiving at one of said plurality of servers a request from the client computer for a virtual machine session. Operation 804 illustrates instantiating a credential repository, wherein the repository exposes interfaces for storing and deleting the user's authentication credentials and associates the authentication credentials with a list of resources available to the user. Operation 806 illustrates validating the request to launch a remote access client application. Operation 808 illustrates attaching at least one of said authentication credentials to the request and sending the request to the remote access client application, wherein the at least one authentication credential can be used to authenticate the user and allow access to a resource associated with the remote access client application. Operation 810 illustrates deleting the credential repository upon receiving a logoff indication.

Figure 9:
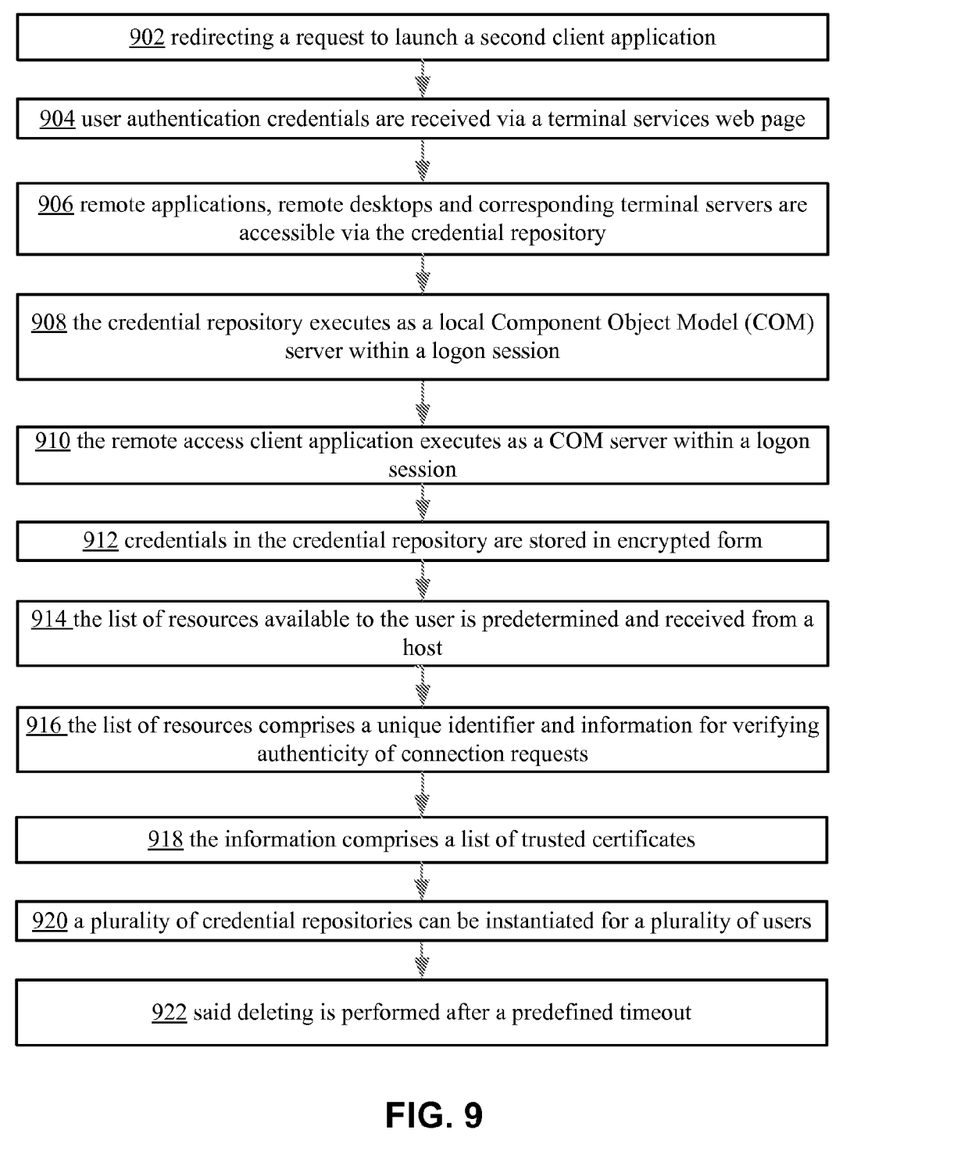
FIG. 9 illustrates an example operational procedure for practicing aspects of the present disclosure.

FIG. 9 illustrates further embodiments of the operational procedure of FIG. 8. As is depicted in FIG. 9, operation 902 illustrates redirecting a request to launch a second client application to the credential repository. Operation 904 illustrates that the user authentication credentials are received via a terminal services web access web page. Operation 906 illustrates that in some embodiments of operation 904, remote applications, remote desktops and corresponding terminal servers are accessible via the credential repository. Operation 908 illustrates that the credential repository executes as a local Component Object Model (COM) server within a logon session. Operation 910 illustrates that the remote access client application executes as a COM server within a logon session.

Operation 912 illustrates that the credentials in the credential repository are stored in encrypted form such that only applications executing on behalf of the logged on user can decrypt the credentials. Operation 914 illustrates that the list of resources available to the user is predetermined and received from a host providing a remote access user interface. Operation 916 illustrates that the list of resources comprises a unique identifier and information for verifying authenticity of connection requests. Operation 918 illustrates that in some embodiments of operation 916, the information comprises a list of trusted certificates.

Operation 920 illustrates that a plurality of credential repositories can be instantiated for a plurality of users. Operation 922 illustrates that said deleting is performed after a predefined timeout.

Figure 10:
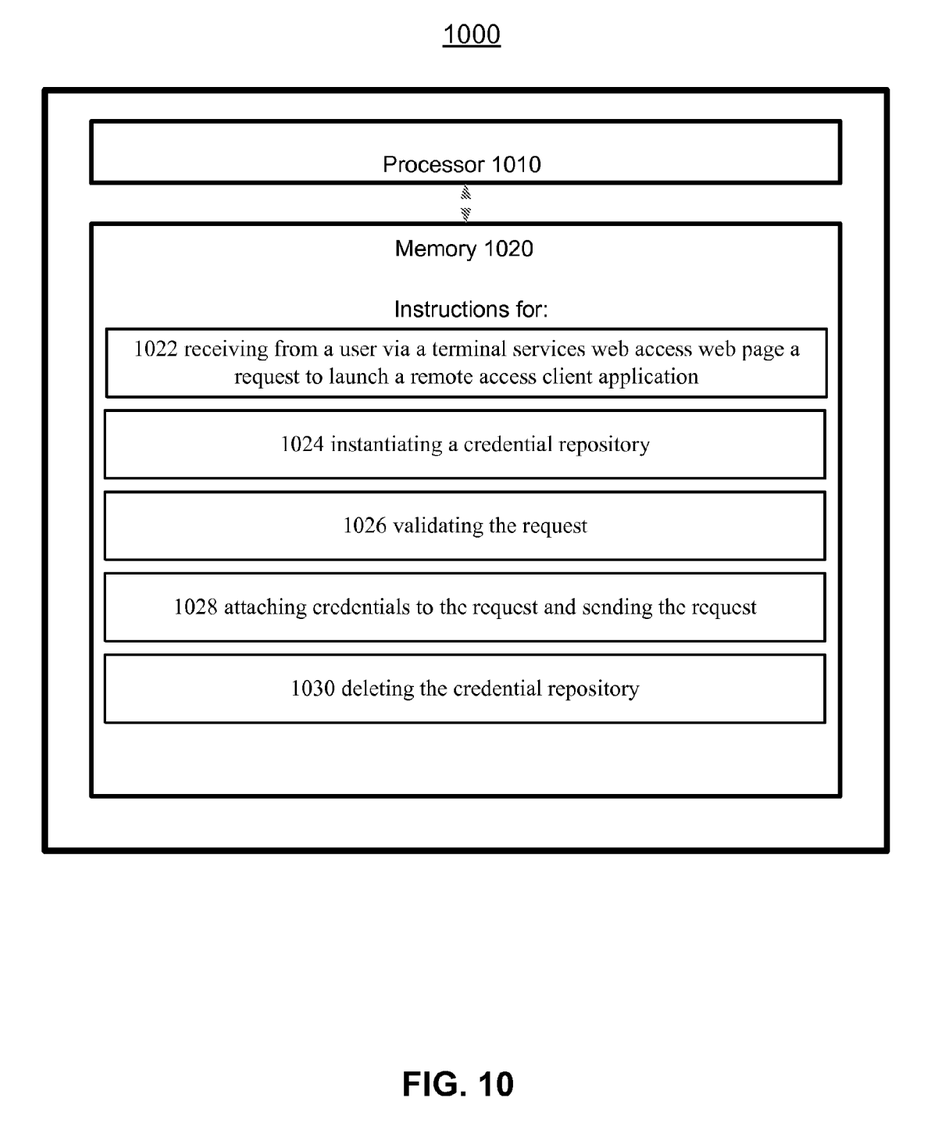
FIG. 10 illustrates an example operational procedure for practicing aspects of the present disclosure.
Figure 11:
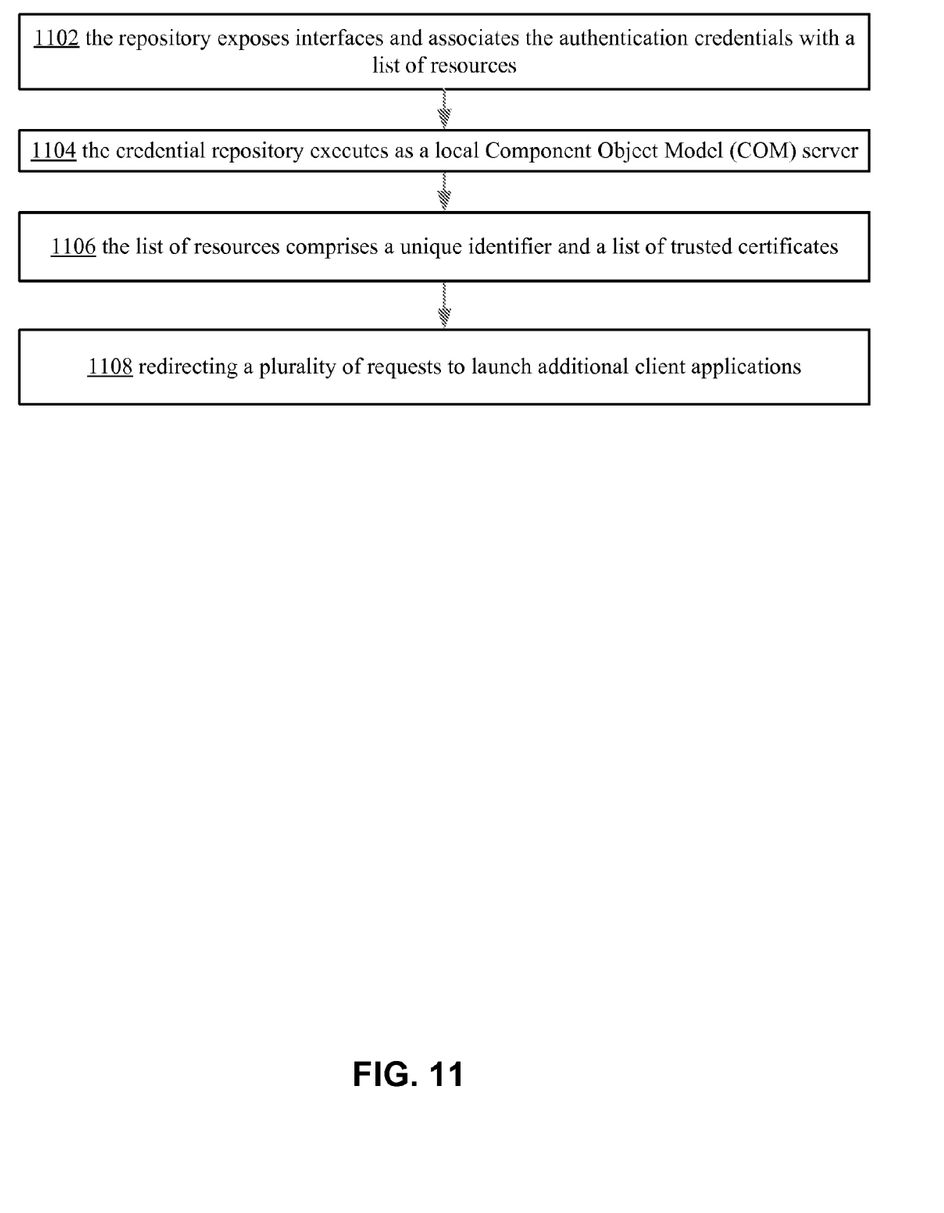
FIG. 11 illustrates an example system and operational procedure for practicing aspects of the present disclosure.

FIGS. 10 and 11 depict an exemplary system and operational procedure for sharing user credentials between remote access client applications. Referring to FIG. 10, system 1000 comprises a process 1010 and memory 1020. Memory 1020 further comprises computer instructions configured to execute processes for sharing user credentials between remote access client applications. Block 1022 illustrates receiving from a user via a terminal services web access web page a request to launch a remote access client application. Block 1024 illustrates instantiating a credential repository, wherein the credential repository comprises the user's authentication credentials stored in encrypted form such that only applications executing on behalf of the user during a current session can decrypt the credentials in the credential repository. Block 1026 illustrates validating the request to launch a remote access client application. Block 1028 illustrates attaching at least one of said authentication credentials to the request and sending the request to a resource associated with the remote access client application. Block 1030 illustrates deleting the credential repository upon receiving a logoff indication.

Continuing with FIG. 11, system 1000 may further be configured as follows. Block 1102 illustrates that the repository exposes interfaces for storing and deleting the authentication credentials and associates the authentication credentials with a list of resources available to the user. Block 1104 the credential repository executes as a local Component Object Model (COM) server within a logon session. Block 1106 illustrates that the list of resources comprises a unique identifier and a list of trusted certificates for verifying authenticity of connection requests. Block 1108 illustrates redirecting a plurality of requests to launch additional client applications to the credential repository.

Any of the above mentioned aspects can be implemented in methods, systems, computer readable media, or any type of manufacture. For example, per FIG. 12, a computer readable medium 1200 can store thereon computer executable instructions for sharing user credentials between remote access client applications. Such media can comprise a first subset of instructions for receiving from a user a request to initiate a logon session and launch a first remote access client application 1202; a second subset of instructions for instantiating a credential repository for the user comprising the user's authentication credentials 1204; a third subset of instructions for validating the request to launch the first remote access client application 1206; a fourth subset of instructions for attaching a first user credential to the request and sending the request to a first resource associated with the first remote access client application 1208; a fifth subset of instructions for redirecting a request to launch a second remote access client application to the credential repository 1210, a sixth subset of instructions for validating the request to launch the second remote access client application 1216, and a seventh subset of instructions for attaching a second user credential to the request to launch a second remote access client application and sending the request to a second resource associated with the second remote access client application 1218. It will be appreciated by those skilled in the art that additional sets of instructions can be used to capture the various other aspects disclosed herein, and that the seven presently disclosed subsets of instructions can vary in detail per the present disclosure.

Figure 12:
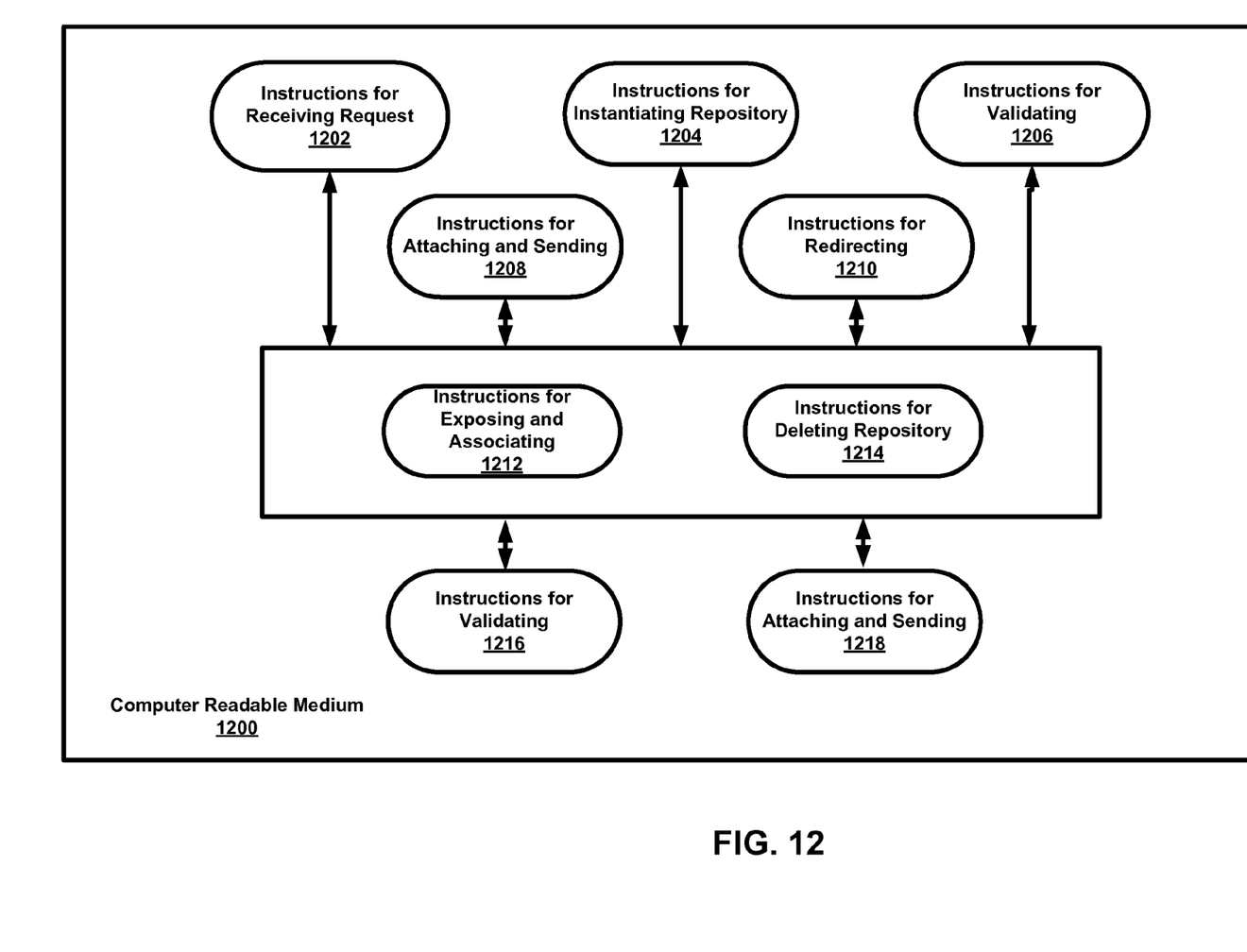
FIG. 12 illustrates a computer readable medium bearing computer executable instructions discussed with respect to FIGS. 1-11 above.

For example, the instructions can further comprise instructions 1212 for the exposing interfaces for storing and deleting the authentication credentials and associates the authentication credentials with a list of resources available to the user. The instructions can further comprise instructions for deleting the credential repository upon completion of a current logon session 1214.

As described above, aspects of the invention may execute on a programmed computer. FIG. 1 and the following discussion is intended to provide a brief description of a suitable computing environment in which the those aspects may be implemented. One skilled in the art can appreciate that the computer system of FIG. 1 can in some embodiments effectuate the server and the client of FIGS. 2-4. In these example embodiments, the server and client can include some or all of the components described in FIG. 1 and in some embodiments the server and client can each include circuitry configured to instantiate specific aspects of the present disclosure.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

FIG. 1 depicts an example of a computing system which is configured to with aspects of the invention. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the invention may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the invention are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the invention described herein have been shown and described, it will be apparent to those skilled in the art that, based upon the teachings herein, changes and modifications may be made and, therefore, the appended claims are to encompass within their scope all such changes and modifications as are within the true spirit and scope of the inventions described herein.

What is claimed:

1. A method for sharing user credentials between multiple remote access client applications when connecting to a predefined set of remote resources, the method comprising:
   receiving from a user a request to launch a remote access client application;
   instantiating a credential repository, wherein the repository exposes programming interfaces for storing and deleting the user's authentication credentials and associates the authentication credentials with a list of resources available to the user, wherein different user authentication credentials are stored independently for different sets of resources, the list of resources available to the user being predetermined and received from a host providing a remote access user interface, the resources defined by a combination of a unique identifier and a list of trusted certificates for verifying authenticity of connection requests;
   validating the request to launch a remote access client application;
   attaching at least one of said authentication credentials to the request and sending the request to the remote access client application, wherein the at least one authentication credential can be used to authenticate the user and allow access to a resource associated with the remote access client application; and
   deleting the credential repository in response to receiving a logoff indication.

2. The method of claim 1 further comprising redirecting a request to launch a second client application to the credential repository.

3. The method of claim 1 wherein the user authentication credentials are received via a terminal services web access web page.

4. The method of claim 3 wherein remote applications, remote desktops and corresponding terminal servers are accessible via the credential repository.

5. The method of claim 1, wherein the credential repository executes as a local Component Object Model (COM) server within a logon session.

6. The method of claim 1, wherein the remote access client application executes as a COM server within a logon session.

7. The method of claim 1, wherein the credentials in the credential repository are stored in encrypted form such that only applications executing on behalf of the logged on user can decrypt the credentials.

8. The method of claim 1, wherein the list of resources comprises a unique identifier and information for verifying authenticity of connection requests.

9. The method of claim 8, wherein the information comprises a list of trusted certificates.

10. The method of claim 1, wherein a plurality of credential repositories can be instantiated for a plurality of users.

11. The method of claim 1, wherein said deleting is performed after a predefined timeout.

12. A system adapted to share user credentials between remote access client applications, comprising:
   at least one processor; and
   at least one memory communicatively coupled to said at least one processor, the memory having stored therein computer-executable instructions for:
      receiving from a user via a terminal services web access web page a request to launch a remote access client application;
      instantiating a credential repository, wherein the credential repository comprises the user's authentication credentials stored in encrypted form such that only applications executing on behalf of the user during a current session can decrypt the credentials in the credential repository, wherein different user authentication credentials are stored independently for different sets of resources, the resources defined by a combination of a unique identifier and a list of trusted certificates for verifying authenticity of connection requests;
      validating the request to launch a remote access client application;
      attaching at least one of said authentication credentials to the request and sending the request to a resource associated with the remote access client application; and
      deleting the credential repository upon receiving a logoff indication.

13. The system of claim 12 wherein the repository exposes interfaces for storing and deleting the authentication credentials and associates the authentication credentials with a list of resources available to the user.

14. The system of claim 12 wherein the credential repository executes as a local Component Object Model (COM) server within a logon session.

15. The system of claim 12, wherein the list of resources comprises a unique identifier and a list of trusted certificates for verifying authenticity of connection requests.

16. The system of claim 12 further comprising computer-executable instructions for redirecting a plurality of requests to launch additional client applications to the credential repository.

17. A computer readable storage device storing thereon computer executable instructions for sharing user credentials between remote access client applications, the medium comprising instructions for:
   receiving from a user a request to initiate a logon session and launch a first remote access client application;

instantiating a credential repository for the user comprising the user's authentication credentials and associating the user's authentication credentials with a list of resources available to the user, the list of resources available to the user being predetermined and received from a host providing a remote access user interface, wherein different user authentication credentials are stored independently for different sets of resources and wherein the resources are defined by a combination of a unique identifier and a list of trusted certificates for verifying authenticity of connection requests;

validating the request to launch the first remote access client application;

attaching a first user credential to the request and sending the request to a first resource associated with the first remote access client application;

redirecting a request to launch a second remote access client application to the credential repository;

validating the request to launch the second remote access client application; and attaching a second user credential to the request to launch a second remote access client application and sending the request to a second resource associated with the second remote access client application.

18. The computer readable storage device of claim 17, wherein the credential repository exposes interfaces for storing and deleting the authentication credentials and associates the authentication credentials with a list of resources available to the user.

19. The computer readable storage device of claim 17, further comprising deleting the credential repository upon completion of a current logon session.

\* \* \* \* \*